US006377297B1

United States Patent
Janko et al.

(10) Patent No.: US 6,377,297 B1
(45) Date of Patent: Apr. 23, 2002

(54) DETECTION OF REPEATED AND FROZEN FRAMES IN A VIDEO SIGNAL

(75) Inventors: Bozidar Janko; Kamalesh Patel, both of Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/457,417

(22) Filed: Dec. 7, 1999

(51) Int. Cl.$^7$ .................................................. H04N 7/01
(52) U.S. Cl. ......................... 348/180; 348/700; 348/722
(58) Field of Search ................................ 348/699–701, 348/180, 192, 722; 382/190, 224, 228, 192, 194

(56) References Cited

U.S. PATENT DOCUMENTS

| | | | | |
|---|---|---|---|---|
| 5,255,091 A | * | 10/1993 | Lyon et al. | 358/140 |
| 5,272,529 A | * | 12/1993 | Frederiksen | 358/133 |
| 5,404,178 A | * | 4/1995 | Kondo et al. | 348/168 |
| 5,519,452 A | * | 5/1996 | Parulski | 348/620 |
| 5,778,108 A | * | 7/1998 | Coleman, Jr. | 348/700 |
| 5,805,742 A | * | 9/1998 | Whitsitt | 382/275 |
| 5,835,163 A | * | 11/1998 | Liou et al. | 348/700 |
| 6,041,142 A | * | 3/2000 | Rao et al. | 382/232 |

* cited by examiner

Primary Examiner—Victor R. Kostak
(74) Attorney, Agent, or Firm—Francis I. Gray

(57) ABSTRACT

An apparatus and method for the detection of repeated and frozen frames in a video signal obtains the absolute differences between pixels in corresponding fields of consecutive frames and generates a logic bit-map based on a threshold that is related to a maximum absolute difference for the field. The logic "1"s in the logic bit-map are counted to determine a normalized distribution count for the field and to determine an actual count in each of a plurality of segments of the logic bit-map. The actual counts are compared with bounds generated from the normalized distribution count and, if all the actual counts for the field are within the bounds, a repeated frame is reported. Alternatively in the absence of noise the actual counts are compared with a minimum value and, if all of the actual counts are below the minimum value, a repeated frame is reported.

9 Claims, 4 Drawing Sheets

DETECTION OF REPEATED AND FROZEN FRAMES IN A VIDEO SIGNAL

BACKGROUND OF THE INVENTION

The present invention relates to detecting artifacts in a video signal, and more particularly to the detection of repeated and frozen frames in a video signal.

Often when video compression is involved in video transport, if the bandwidth available for transport is insufficient, a compression coder may simple re-transmit a copy of a previous frame. The defect thus created is called "frame freeze" and is perceived by viewers as a "jerk" in a moving object shown in the video. Also compression coders sometimes stop encoding, i.e., they freeze. The last frame before this freezing occurs is retained and displayed by decoders, producing a still image or an image that flickers as interlaced field1 and field2 are shown in an alternating fashion.

A trivial solution for the problem of repeated or "freeze" frames is to subtract the corresponding fields in consecutive frames pixel by pixel. If all of the resulting pixels in the bit-map are zero, the implication is that there is a repeated frame. However such a trivial solution does not work reliably in practice because there may be random noise present in the video. Depending upon where in the video chain such noise is added, the noise pattern may not repeat from video field to video field. Therefore where the meaningful video content in consecutive frames is repeated, the difference of two fields does not produce zero since the random noise patterns do not register, i.e., they are not identical.

What is desired is a method and apparatus for the detection of repeated and frozen frames in a video signal that works reliably in a practical environment, i.e., in the presence of noise.

BRIEF SUMMARY OF THE INVENTION

Accordingly the present invention provides an apparatus and method for the detection of repeated and frozen frames in a video signal by obtaining the absolute differences between pixels from corresponding fields in consecutive frames. From the absolute differences a logic bit-map is generated, a logic "1" being inserted into the logic bit-map for each pixel where the absolute difference exceeds a threshold that is a function of a maximum derived from the absolute differences for the field. A normalized distribution count is determined as the sum of all the logic "1"s in the logic bit-map. Then the logic bit-map is divided into a number of cells of equal size. The logic "1"s for each cell also are counted. Bounds are generated from the normalized distribution count, and the actual counts for each cell are compared with the bounds. If all of the actual counts for the field are within the bounds, a repeated frame is reported. Alternatively in a noiseless environment if all of the actual counts are less than a minimum value, a repeated frame is reported.

The objects, advantages and other novel features of the present invention are apparent from the following detailed description when read in conjunction with the appended claims and attached drawing.

DETAILED DESCRIPTION OF THE INVENTION

The solution to the problem of repeated frames is as follows:

For every two consecutive frames in a video sequence the luminance values in corresponding fields are subtracted, i.e., the luminance values in field1 of one frame are subtracted from the corresponding luminance values in field1 of the preceding frame, to produce a difference map.

Having obtained the difference map, each difference value is replaced with its absolute value.

A Maximum is found as the largest of these absolute values.

The difference map of absolute values is converted into a logic map by placing values of "1" in places where the absolute value of the differences exceed a threshold based on a fraction of the Maximum, such as 50% of Maximum. Otherwise a "0" is placed in places where the absolute value of the differences does not exceed such threshold.

Figure 1A:
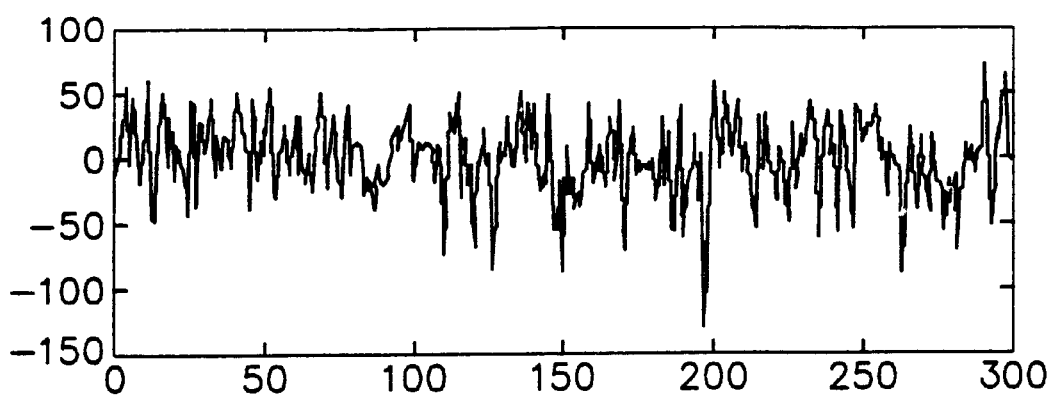
FIGS. 1A, 1B and 1C are graphic views showing the generation of logic bit-maps according to the present invention.
Figure 1B:
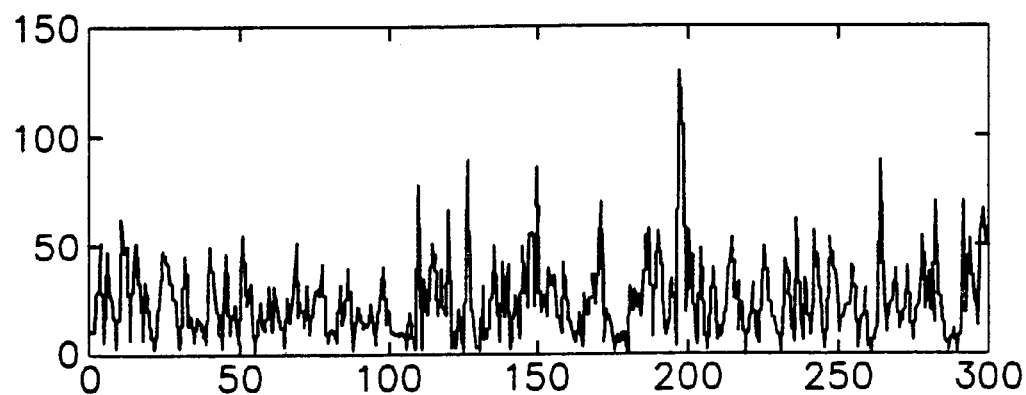
Figure 1C:
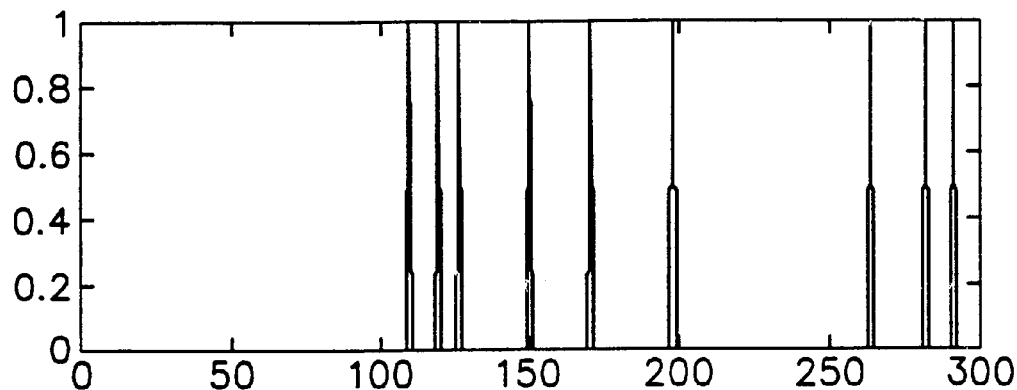

In FIGS. 1A, 1B and 1C the various difference maps are shown, (a) for the differences between luminance values in the corresponding fields of consecutive frames, (b) for the absolute differences, and (c) for the resulting logic map.

Figure 2A:
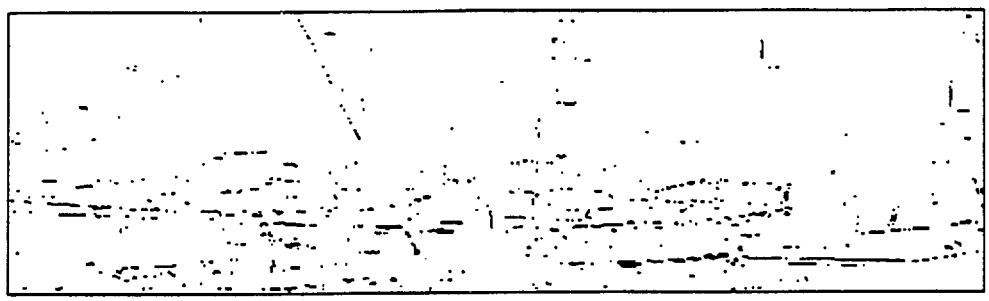
FIGS. 2A and 2B are graphic views showing logic bit-maps for (a) a video signal having motion and (b) a repeated frame with noise present.
Figure 2B:
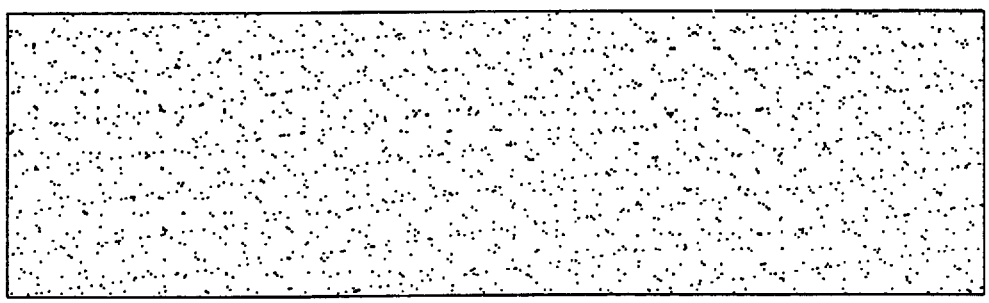

Referring now to FIGS. 2A and 2B logic maps for consecutive frames (a) having motion between the two frames and (b) having repeated frames are shown. The logic map having motion between consecutive frames shows an outline of the moving object, while the logic map for repeated frames shows only random noise.

Figure 3A:
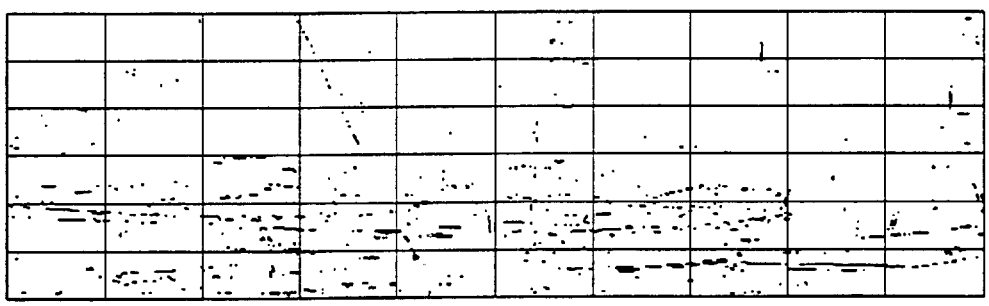
FIGS. 3A and 3B are graphic views showing segmentation of logic bit-maps corresponding to FIGS. 2A and 2B.
Figure 3B:
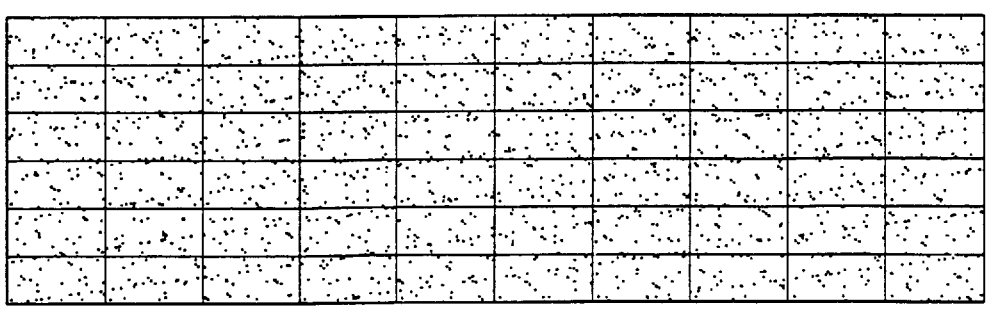
Figure 4A:
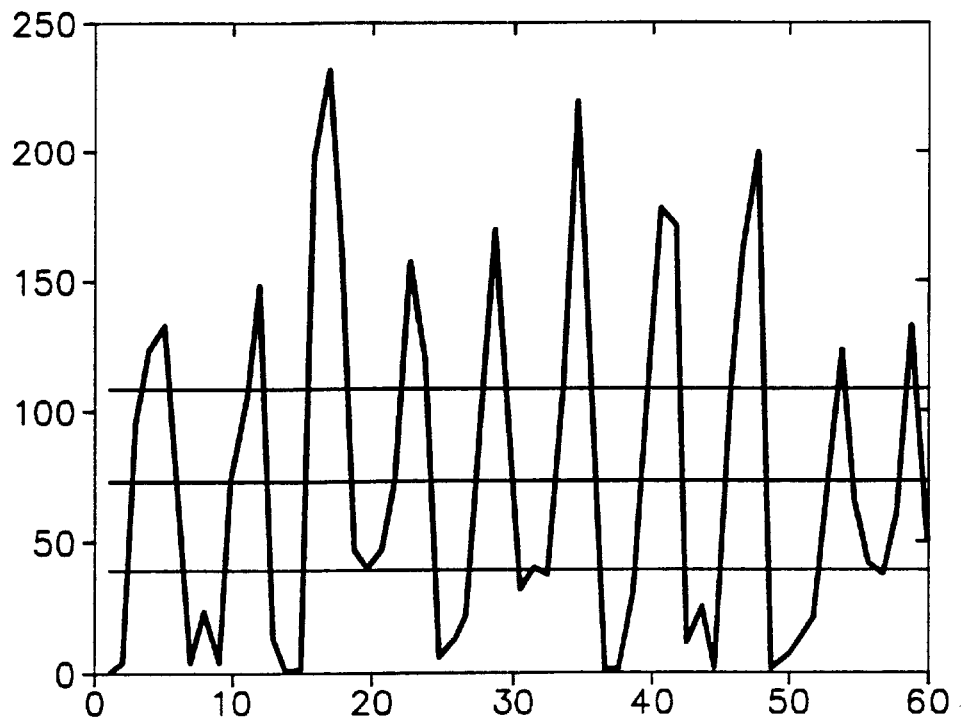
FIGS. 4A and 4B are graphic views showing actual cell count variations for the logic bit-maps corresponding to FIGS. 3A and 3B.
Figure 4B:
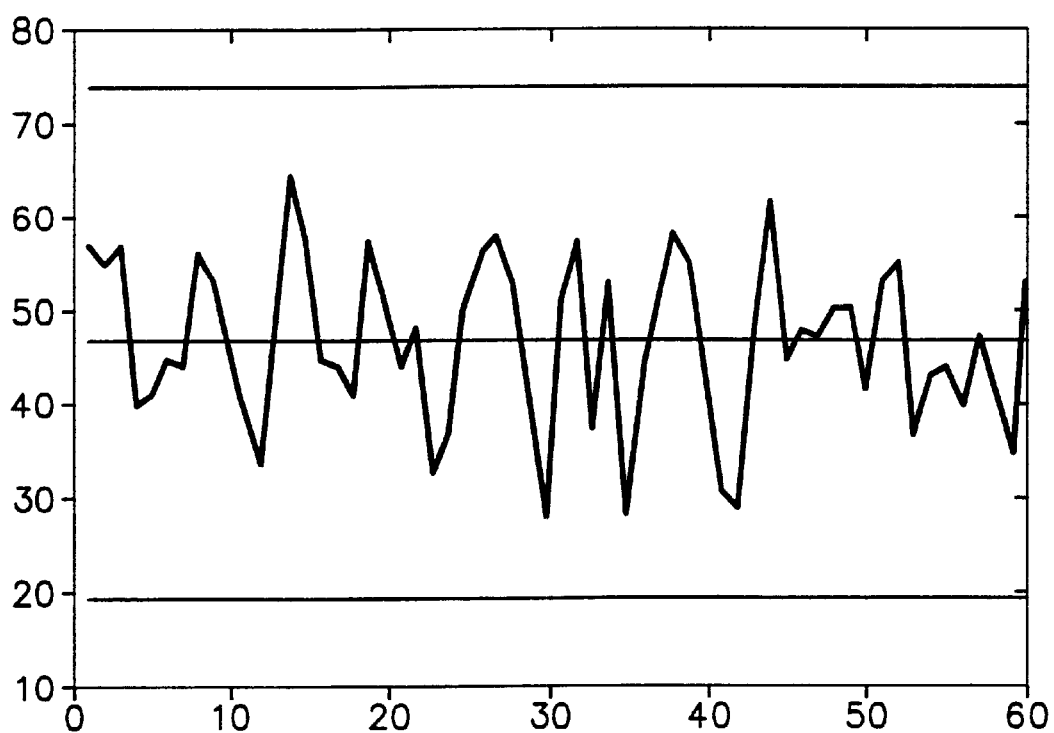

The next step is to divide the logic map into N equal areas, for example 60 rectangles, as shown in FIGS. 3A and 3B for the corresponding logic maps shown in FIGS. 2A and 2B. The noise values in each area are summed to produce an array of N numbers. Where moving video is present, some of the N numbers are considerably larger than others; while where only random noise is present in the video, the N numbers have approximately equal values within the limits of statistical fluctuation, as shown respectively in FIGS. 4A and 4B respectively.

Whether just random noise is present, i.e., the frame is repeated, is determined as follows:

Determine a count C of the logic "1" pixels in each of the N cells corresponding to a uniform distribution over all cells.

For only noise present the count in each cell is within bounds of some statistical measure, such as C'=C+/−4*SQRT(C) where C' is the count of logic "1" for a particular one of the N cells. If there is a single cell where the value of C' exceeds these bounds, then the frame is not repeated.

As another criterion to cover the case where no noise is present, if C' for each cell is less than some minimum number, such as five, then the frame is repeated.

Figure 5:
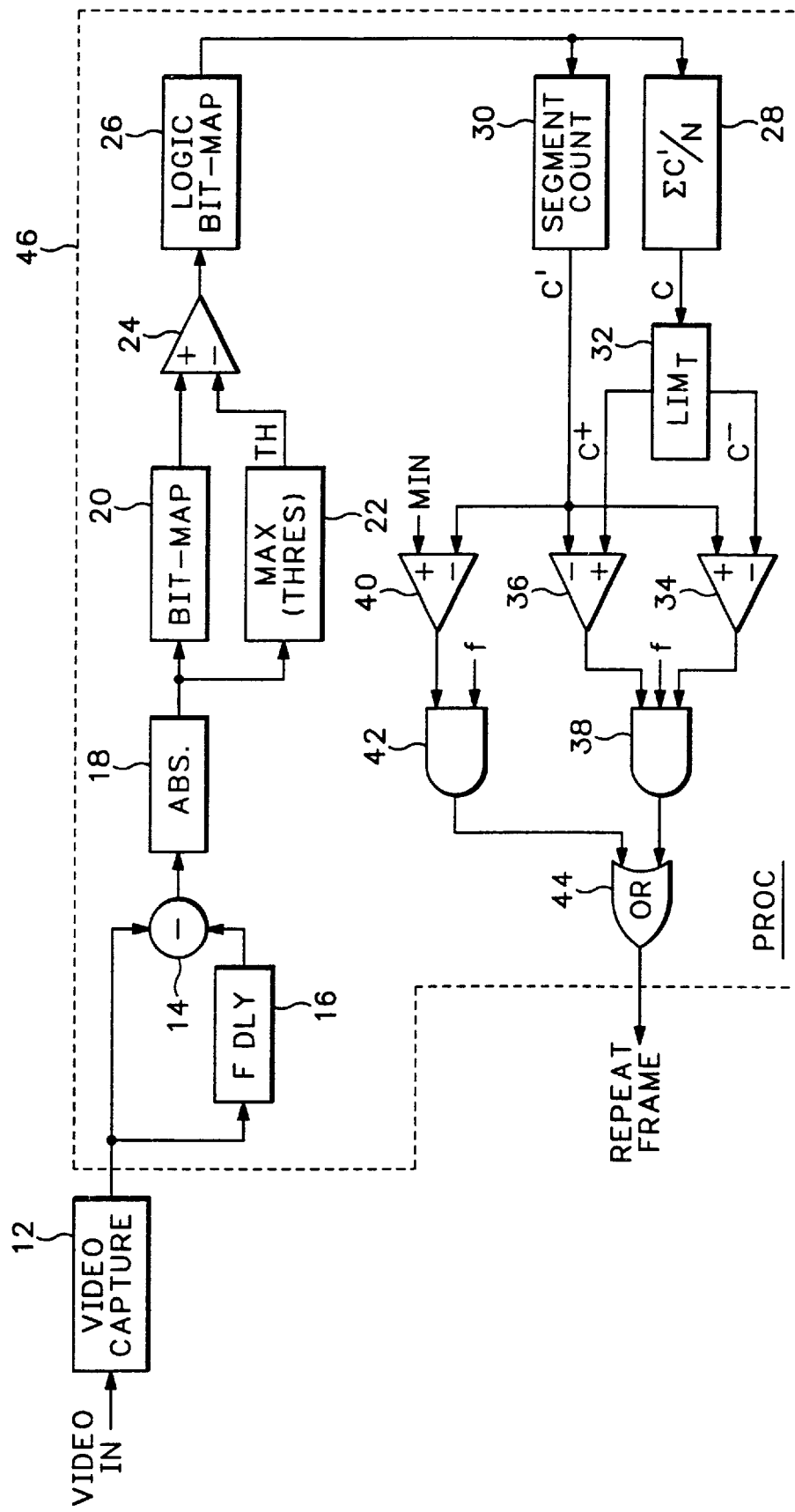
FIG. 5 is a block diagram view of an apparatus for detecting repeated frames in a video signal according to the present invention.

An apparatus to report instances of repeated frames is shown in FIG. 5. A capture module 12 receives the video signal, digitizes it if in analog form, separates the active video from timing information and decodes the active video to provide luminance values for each pixel of the active video. The luminance values for a field are input to a subtraction unit 14 and to a frame delay unit 16, the output from the frame delay unit also being input to the subtraction unit. Thus the inputs to the subtraction unit 14 are corresponding fields from consecutive frames. The differences from the subtraction unit 14 are input to an absolute value unit 18 that produces absolute differences which are stored in a bit-map 20. For each field the maximum absolute difference value Maximum is determined by a threshold generator 22 and multiplied by a specified fraction, such as 0.5, to produce a threshold value TH. For each field the absolute differences from the bit-map 20 are input to a comparator 24 together with the threshold value, and the output from the comparator is input to a logic bit-map 26. The output from the logic bit-map 26 for each field is input to a normal distribution calculator 28 and to a segmentation counter 30. The normal distribution calculator 28 totals the number of logic "1" values in the logic bit-map 26 and divides it by N, the number of segments into which the bit-map is divided, to produce the normal distribution count C. The segmentation counter 30 counts the number of logic "1" values for each segment of the logic bit-map 26 to produce the segment counts C'. The normal distribution count C is input to a limit circuit 32 to provide the bounds for the segment counts C'. The bounds from the limit circuit 32 are equal to C+/−K, where K may be equal to 4*SQRT(C). The bounds are input to respective comparators 34, 36 together with the segment counts C'. The outputs from the comparators 34, 36 are input to an AND gate 38 so that, if all segment counts C' for a field are within the bounds, an output is produced to indicate a repeated frame. Alternatively the segment counts C' are input to yet another comparator 40 where they are compared with a minimum value, such as 5. If all segment counts C' for a field are less than the minimum value, then the comparator 40 provides an output to indicate a repeated frame. The comparators 34, 36 include a flag circuit that is set when any of the segment values C' for a field are out of bounds, which flag circuit is reset at the start of the next field. Setting of the flag circuit inhibits the AND gate 38 so no repeat frame output is provided at the end of the field. The AND gate 38 is enabled by a field signal asserted at the end of each field to report the status of the flag circuit. Likewise an AND gate 42 at the output of the noiseless comparator 40 is enabled by the field signal so that the status of a flag circuit in that comparator, which is set if the minimum is exceeded by any segment count C' within the field, is reported. The outputs from the AND gates 38, 42 may be combined by an OR gate 44 to provide the repeat frame output in either situation. The elements 14–44 may be replaced by a microprocessor 46 operating under software control to perform all the corresponding functions.

Thus the present invention provides an apparatus and method for the detection of repeated and frozen frames in a video signal by building a logic bit-map for each field of the video signal, the logic bit-map representing the pixels from corresponding fields of consecutive frames that exceed a determined threshold, comparing the logic "1" count for each of N segments of the logic bit-map with a normalized count per cell for the entire logic bit-map, and reporting repeated frames when the segment count is outside bounds based upon the normalized count.

What is claimed is:

1. A method of detecting repeated frames in a video signal comprising the steps of:

building from corresponding fields of consecutive frames a logic bit-map for each field of the video signal as a function of absolute differences between pixels of the corresponding fields;

segmenting the logic bit-map into a plurality of cells; and reporting repeated frames as a function of a count for each cell versus a normalized count for each cell.

2. The method as recited in claim 1 wherein the building step comprises the steps of:

differencing the pixels from the corresponding fields of the consecutive frames to obtain the absolute differences;

from the absolute differences determining a threshold value; and inserting a logic "1" into the logic bit-map for each pixel where the absolute difference exceeds the threshold value.

3. The method as recited in claim 2 wherein the reporting step comprises the steps of:

determining the normalized cell count as the sum of the logic "1"s for the logic bit-map for each field divided by the number of cells;

counting for each cell in each field the number of logic "1"s to produce the count for each cell;

determining bounds from the normalized cell count; and reporting repeat frames when the count for all cells in the field are within the bounds.

4. An apparatus for detecting repeated frames in a video signal comprising:

means for building from corresponding fields of consecutive frames a logic bit-map for each field of the video signal as a function of absolute differences between pixels of the corresponding fields;

means for segmenting the logic bit-map into a plurality of cells; and means for reporting repeated frames as a function of a count for each cell versus a normalized count for each cell.

5. The apparatus as recited in claim 4 wherein the building means comprises:

means for differencing the pixels from the corresponding fields of the consecutive frames to obtain the absolute differences;

mean for determining from the absolute differences a threshold value; and means for inserting a logic "1" into the logic bit-map for each pixel where the absolute difference exceeds the threshold value.

6. The apparatus as recited in claim 5 wherein the reporting means comprises:

means for determining the normalized cell count as the sum of the logic "1"s for the logic bit-map for each field divided by the number of cells;

means for counting for each cell in each field the number of logic "1"s to produce the count for each cell;

means for determining bounds from the normalized cell count; and means for reporting repeat frames when the count for all cells in the field are within the bounds.

7. An apparatus for detecting repeated frames in a video signal comprising:

a video capture module having the video signal as an input, the video capture module building from corresponding fields of consecutive frames as an output a logic bit-map for each field of the video signal, the logic bit-map being a function of absolute differences between pixels of the corresponding fields;

a segmentor for segmenting the logic bit-map into a plurality of cells; and a processor for reporting repeated frames as a function of a count for each cell versus a normalized count for each cell.

8. The apparatus as recited in claim 7 wherein the video capture module comprises:

a differencing circuit having the video signal as an input, the differencing circuit differencing the pixels from the corresponding fields of the consecutive frames to provide as an output the absolute differences;

a threshold generator having the absolute differences as an input, the threshold generator determining from the absolute differences a threshold value as an output; and a comparator having the absolute differences and the threshold values as inputs, the comparator inserting a logic "1" into the logic bit-map for each pixel where the absolute difference exceeds the threshold value.

9. The apparatus as recited in claim 8 wherein the comparator comprises:

a normalizer having the logic bit-map as an input, the normalizer producing as an output the normalized cell count as the sum of the logic "1"s for the logic bit-map for each field divided by the number of cells;

a segmentation counter having the logic bit-map as an input, the segmentation counter counting for each cell in each field the number of logic "1"s to produce as an output the count for each cell;

a limiter having the normalized cell count as an input, the limiter determining bounds as outputs, the bounds being a function of the normalized cell count; and a report comparator having the bounds and the count for each cell of the field as inputs, the report comparator providing as an output a flag indicating repeat frames when the count for all cells in the field are within the bounds.

* * * * *